United States Patent
Hikmet et al.

(10) Patent No.: US 9,938,455 B2
(45) Date of Patent: Apr. 10, 2018

(54) LUMINESCENT PRODUCT, A LIGHT SOURCE AND A LUMINAIRE INCLUDING A FOAM

(75) Inventors: Rifat Ata Mustafa Hikmet, Eindhoven (NL); Godefridus Johannes Verhoeckx, Eindhoven (NL); Ties Van Bommel, Horst (NL); René Theodorus Wegh, Veldhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/003,241

(22) PCT Filed: Feb. 28, 2012

(86) PCT No.: PCT/IB2012/050926
§ 371 (c)(1),
(2), (4) Date: Sep. 5, 2013

(87) PCT Pub. No.: WO2012/120408
PCT Pub. Date: Sep. 13, 2012

(65) Prior Publication Data
US 2013/0342101 A1   Dec. 26, 2013

(30) Foreign Application Priority Data
Mar. 8, 2011  (EP) .................................. 11157310

(51) Int. Cl.
| | | |
|---|---|---|
| *H01L 33/50* | (2010.01) |
| *F21K 9/64* | (2016.01) |
| *C09K 11/02* | (2006.01) |
| *C09K 11/06* | (2006.01) |
| *H05B 33/10* | (2006.01) |
| *H05B 33/20* | (2006.01) |
| *H05B 33/12* | (2006.01) |

(52) U.S. Cl.
CPC ............ *C09K 11/025* (2013.01); *C09K 11/06* (2013.01); *F21K 9/64* (2016.08); *H05B 33/10* (2013.01);
(Continued)

(58) Field of Classification Search
CPC ... H01L 33/505; H01L 33/641; H01L 33/642; H01L 33/644; H01L 33/504; F21V 9/16; F21K 9/64; C09K 11/025
(Continued)

(56) References Cited

U.S. PATENT DOCUMENTS

| | | |
|---|---|---|
| 5,326,298 A | 7/1994 | Hotomi |
| 6,855,027 B2 | 2/2005 | Duggal et al. |

(Continued)

FOREIGN PATENT DOCUMENTS

| | | |
|---|---|---|
| JP | 2000336201 | 12/2000 |
| WO | WO 2008044759 A1 * | 4/2008 |

*Primary Examiner* — Anh Mai
*Assistant Examiner* — Steven Horikoshi (57) ABSTRACT

A luminescent product 100, a lamp and a light source are provided for converting light of a first color into light of a second color. The luminescent product 100 comprises a matrix polymer 108 and another material 106. The matrix polymer 108 comprises a luminescent material which converts light of a first color into light of a second color. The another material 106 is light transmitting. The luminescent product 100 is at least partially light transmitting and the matrix polymer has a three dimensional structure which has multiple surfaces being an interface between the matrix polymer and the another material to allow, in use, a light beam 104, which impinges on a side 102 of the luminescent product 100, to pass at least four times an interface between the matrix polymer 108 and the another material 106 before at least a part of the light beam 104 leaves the luminescent product 100 at another side 110 of the luminescent product 100.

13 Claims, 6 Drawing Sheets

(52) U.S. Cl.
CPC ............ *H05B 33/12* (2013.01); *H05B 33/20* (2013.01); *C09K 2211/1011* (2013.01); *C09K 2211/1029* (2013.01); *Y10T 428/24157* (2015.01); *Y10T 428/24322* (2015.01); *Y10T 428/24826* (2015.01); *Y10T 428/31504* (2015.04)

(58) Field of Classification Search
USPC .............................................. 428/116, 317.9
See application file for complete search history.

(56) References Cited

U.S. PATENT DOCUMENTS

| | | | |
|---|---|---|---|
| 7,405,516 B1 | 7/2008 | Wedding | |
| 7,436,002 B2 | 10/2008 | Brunner et al. | |
| 7,462,878 B2 | 12/2008 | Richter et al. | |
| 7,833,076 B1 | 11/2010 | Strbik, III et al. | |
| 2003/0118807 A1* | 6/2003 | Laney | G02B 5/0247 428/315.5 |
| 2005/0212397 A1* | 9/2005 | Murazaki et al. | 313/487 |
| 2008/0206910 A1 | 8/2008 | Soules et al. | |
| 2008/0252198 A1* | 10/2008 | Katano | C09K 11/06 313/503 |
| 2009/0114938 A1* | 5/2009 | Hsu | H01L 33/501 257/98 |
| 2009/0284155 A1* | 11/2009 | Reed | F21V 23/0442 315/32 |
| 2010/0038665 A1* | 2/2010 | Sugiura et al. | 257/98 |
| 2011/0068676 A1* | 3/2011 | Jeon et al. | 313/483 |
| 2011/0241044 A1* | 10/2011 | Jang et al. | 257/98 |
| 2012/0200919 A1* | 8/2012 | Petaja | G02B 5/0247 359/483.01 |

\* cited by examiner

LUMINESCENT PRODUCT, A LIGHT SOURCE AND A LUMINAIRE INCLUDING A FOAM

FIELD OF THE INVENTION

The invention relates to luminescent products for converting at least a part of light of a first color into light of a second color. The invention further relates to a light source comprising said luminescent product, and a luminaire comprising said light source.

BACKGROUND OF THE INVENTION

Luminescent materials are widely used in light sources for converting light of a first color into light of a second color. Such use is discussed in U.S. Pat. No. 7,462,878. The luminescent material is arranged in a compact converter layer. The temperature rises in the converter layer because of the conversion of light with a high energy into light of a longer wavelength (Stokes shift), which has a lower energy. The difference of energy is dissipated and as such converted into heat. At the outside surface of the converter layer the heat is transferred to the ambient and/or to a heat sink. The luminescent material may be an organic or an inorganic luminescent material. A problem of organic luminescent materials is their photo-chemical stability, which strongly depends on the temperature of the material during illumination.

If an organic luminescent material is used in the converter layer of the cited patent, the lifetime of the luminescent material will be relatively short. The temperature of the converter layer becomes relatively high in operation and as such the quality of organic material degrades and after a relatively short period the conversion by the organic luminescent material will be less efficient and/or less light will be converted towards the second color.

SUMMARY OF THE INVENTION

It is an object of the invention to provide a luminescent product comprising a luminescent material which has a relatively long lifetime.

A first aspect of the invention provides a luminescent product as described and claimed herein. A second aspect of the invention provides a lamp as described and claimed herein. A third aspect of the invention provides a luminaire as described and claimed herein. Advantageous embodiments are defined throughout the specification in the independent and dependent claims.

A luminescent product in accordance with the first aspect of the invention is provided for converting light of a first color into light of a second color. The luminescent product comprises a matrix polymer and another material. The matrix polymer comprises a luminescent material which converts light of a first color into light of a second color. The another material is light transmitting. The luminescent product is at least partially light transmitting and the matrix polymer has a three dimensional structure which has multiple surfaces being an interface between the matrix polymer and the another material to allow, in use, a light beam, which impinges on a side of the luminescent product, to pass at least four times an interface between the matrix polymer and the another material before at least a part of the light beam leaves the luminescent product at another side of the luminescent product.

A three dimension structure which allows the light beam to pass at least four times an interface between the material of three dimensional structure and the another material, has a relatively large surface area which is the interface between the matrix polymer and the another material. Thus, the matrix polymer is not manufactured in a solid dense layer or a solid dense three dimensional shape, which means that, the matrix polymer has a structure which may be compared with a structure with hollow spaces and at least some of the hollow spaces are filled with the another material. It is to be noted that the structure is not limited to structures with hollow spaces, the structure may also be a bunch of fibers. If the matrix polymer would be manufactured as a solid dense structure, the light beam would pass the interface between the matrix polymer and the another material at the maximum twice: one time when the light beam enters the matrix polymer, and one time when the light beam exits the matrix polymer. If the light beam, which is in general transmitted in a substantially straight direction through the luminescent product, passes more than two times the interface, the interface area is at least larger than the interface area would be in the case of a solid dense structure, because otherwise the interface couldn't be passed more than two times.

It is the insight of the inventors that increasing the surface area that is the interface between the matrix polymer and the another material is advantageous to increase the lifetime of the luminescent material. If the surface area is relatively large, the matrix polymer has a relatively large surface through which the heat, which is, in use, generated in the luminescent material, may be conducted away from the luminescent material towards the another material. Thus, the temperature in the matrix polymer will stay within acceptable limits, which prevents the degradation of the luminescent material. The heat conduction via the larger interface area results in a better heat spreading throughout the whole luminescent product, thereby reducing the temperature of the matrix polymer and increasing the temperature of the another material.

The another material may be used to further transport and/or conduct the heat away from the matrix polymer. The another material is, for example, in contact with the ambient of the luminescent product and the another material may transfer the heat towards the ambient. If the another material cannot flow or stream, the another material may act as a heat conductor to drain away the heat to the ambient of the luminescent material. If the another material may flow or stream, the heat may be transported with the another material towards the ambient. Especially when the another material is air and if the air is in open contact with the ambient air, the air functions as a heat carrier for carrying away the heat towards the environment of the luminescent product.

Further, the interface between the matrix polymer and the another material is also a place where a part of the light may be reflected, scattered, or diffused. Further, the luminescent material emits the light of the second color in all directions, and as such a diffuse light emission of the second color is obtained. In specific applications this scattering and diffusing characteristic of the luminescent product may be advantageously used to obtain a specific angular light emission distribution. In order to influence the scattering and/or diffusing behavior of the luminescent product, the matrix polymer may comprise scattering or diffusing particles.

It is to be noted that the luminescent product is not limited to the use of a single luminescent material within the matrix polymer. Other luminescent material may be comprised in the matrix polymer as well for converting light of the first color into other colors. By using specific combinations of luminescent materials, specific light output spectra may be obtained.

The interface between the matrix polymer and the another material may be a direct transition of the matrix polymer to the another material, however, in other embodiments, the interface itself may be made of another material which separates the matrix polymer from the another material. For example, the interface itself may be a thin layer of a specific polymer which allows the conduction of heat between the another material and the matrix polymer, or the interface is a thin layer of glass.

In this context, light of a color typically comprises light having a predefined spectrum. The predefined spectrum may, for example, comprise a primary color having a specific bandwidth around a predefined wavelength, or may, for example, comprise a plurality of primary colors. The predefined wavelength is a mean wavelength of a radiant power spectral distribution. In this context, light of a color also includes non-visible light, such as ultraviolet light. The light of a primary color, for example, includes Red, Green, Blue, Yellow and Amber light. Light of a certain color may also comprise mixtures of primary colors, such as Blue and Amber, or Blue, Yellow and Red.

The luminescent product is at least light transmitting, which means that at least a portion of the light, which impinges on the luminescent product, is transmitted through the luminescent product and is once again emitted into the environment of the luminescent product. Thus, the luminescent product may be fully or partially transparent, or may be translucent.

A matrix polymer is a polymer in which the luminescent material is dispersed or molecularly dissolved. The polymer matrix may be chosen amongst polymers such as acrylates (for example polymethylmethacrylate), polycarbonate, polystyrene, polyethylene, polyethylene terepthalate, polyethylene naphtalate and their copolymers and blends.

In an embodiment, at least a part of the three dimensional structure is a foam. The foam is a structure which comprises a multiple of walls that (at least) partly enclose multiple cells. The cells may be closed or the cells may be in open contact with each other. When the three dimensional structure is a foam, the walls may be formed by the matrix polymer and in that case the cells may be filled with the another material. Light which comprises the first color and which impinges on the foam is transmitted through the consecutive walls of consecutive cells. In the walls the light may partly be converted to the second color. The light which is not converted, and the generated light of the second color, is transmitted further through the structure. The heat which is generated in the walls is to a large extend conducted towards the cells and provided to the another material. Consequently, the heat is spread and the temperature of the matrix polymer comprising the luminescent material does not become too large.

Foams may be manufactured relatively easily and are as such a cost effective solution. Further, foams may have a very stable structure, especially when the walls are made of a solid material. In many applications such a stable foam is advantageous because it allows the use of the foam as a structural element of for example a device. Further, specific foams are initially relatively flexible and after a relatively short time the structure of such foams becomes solid. This allows the injection of the relatively flexible foam in a space which is then completely filled with the foam. Other types of foams remain flexible and may be used e.g. in clothes.

In further embodiment, the foam is a solid foam with an open cell structure, or the foam being a syntactic foam comprising hollow particles.

An open cell structure means that the cells are not completely enclosed by walls, but that adjacent cells may be in open contact with each other, and that the cells at the border of the foam are in open contact with the environment of the foam. Thus, the another material which fills the cells may transport the heat towards the ambient of the luminescent product, which is advantageous in the context of heat management. As a consequence the temperature within the matrix polymer will be reduced even more which results in an even longer lifetime of the luminescent product.

A syntactic foam is a foam with closed cells and the cells are formed by hollow particles which are embedded in the basis material of the foam, which may be the matrix polymer. The hollow particles are often spheres which may be manufactured from glass, ceramics and polymers. In specific embodiment it may be advantageous to use syntactic foams because they have a relatively large strength-to-weight ratio. Further, the hollow particles may be filled with another material that has a relatively high thermal capacitance such that it may absorb a lot of heat generated by the luminescent material. A material with a high thermal capacitance is a phase shift material which absorbs a lot of heat when its phase changes from solid to fluid.

In another embodiment, at least a part of the three dimension structure has the structure of a honeycomb. A honeycomb is composed of hexagonal cells which are separated by walls. The total area of the interface between the walls and the cells is relatively large with respect to the amount of used material or the size of the structure. The structure may comprise one or more layers of such cells in all three dimensions. Especially when light beam impinges on a side wall of a cell, the light beam will mainly travel through the cell, through another wall, and through a subsequent cell, etc. Thus, the light beam may pass several walls of the matrix polymer and the heat generated in the matrix polymer may be provided to the cells which comprise the another material. The structure of a honeycomb is a very efficient structure with respect to material use for walls compared to the total volume of the three dimensional structure. Further, a honeycomb structure is relatively strong.

It is to be noted that other structures are possible as well, such as a plurality of attached luminescent foils which form squares or round shapes.

In an alternative embodiment, the three dimensional structure comprises a plurality of matrix polymer fibers comprising the luminescent material. Thus, the fibers are surrounded by the another material and as such there is a relatively large interface area between the matrix polymer and the another material. At least a part of the light which impinges on one side of the structure passes at least through two polymer fibers, thereby passing at least four times the interface between the matrix polymer and the another material. In a practical embodiment the three dimensional structure comprises a large number of fibers such that most of the light of the light beam is at least transmitted twice through one or more polymer fibers.

In another embodiment, the three dimensional structure comprises a stack of layers wherein the layers of the matrix polymer and the layers of the another material alternate. Especially when light impinges on the stack of layers in a direction which is not parallel to the alternating layers, the light passes several times the interface between the matrix polymer and the another material. Because the layers of a matrix polymer and the another material alternate, the area of the interface between the matrix polymer and the another material is relatively large resulting in a good heat spreading between the matrix polymer and the another material and consequently resulting in a longer lifetime of the luminescent product.

In a further embodiment, the layers of the another material comprise spacers for maintaining a distance between the layers of the matrix polymer. Especially when the another material is air or a liquid, the spacers prevent that the layers of matrix polymer glue together and thereby reducing the area of the interface between the matrix polymer and the another material.

In an embodiment, the layers of the matrix polymers comprise holes. The holes allow a flow or stream of another material through the stack of layers thereby providing an additional heat transport mechanism to the ambient of the luminescent product.

In another embodiment, the another material comprises a liquid or a gas. If the another material is a gas it may be air, which allows the use of the air as a heat transport mechanism to the environment of the luminescent product. The gas may also be a specific gas with a very low chemical reactivity, such as $N_2$, or a noble gas, such as Helium (He), neon (Ne), argon (Ar), krypton (Kr), or xenon (Xe). Any mixture of the example of gasses is possible as well. Liquids have often a relatively high heat capacitance and as such the liquid may absorb a lot of heat that is generated by the luminescent material. Further, the liquid may be used to transport the heat to other places in the luminescent product or to the environment of the luminescent product. Examples of liquids include, but are not limited to, water, different types of oils or fluorocarbon-based fluids. Mixtures of liquids are possible as well and the liquid may comprise additional additives, such as for example dissolved compositions.

In an embodiment, the luminescent material comprises an organic phosphor. Organic phosphors have a high quantum efficiency and are often transparent, which prevents undesired scattering and increases efficiency. Organic luminescent materials have more advantages. The position and the bandwidth of the luminescence spectrum can be designed with ease to be anywhere in the visible range. As such it is relatively easy to manufacture a light source which emits white light with high efficacy. The white light may be a combination of at least two colors of light, and thus the light source may comprise a single light emitter that emits light of a first color and comprise at least one organic luminescent material converts a part of the light of the first color into a light of a second color. The luminescent material may also comprise two or more organic luminescent materials and/or combinations of organic and inorganic luminescent materials for converting light of the first color into two or more other colors.

In a further embodiment, the organic phosphor comprises perylene derivates.

In the three dimensional structure allows, in use, at least a part of the light beam, which impinges on a side of the luminescent product, to pass at least eight times the interface between the matrix polymer comprising the luminescent material and the another material. According to this embodiment the heat generation is performed at more locations and as such the heat is better spread throughout the luminescent product thereby increasing the lifetime of the luminescent material.

According to a second aspect of the invention, a light source is provided which comprises the luminescent product as described and claimed herein, and a light emitter for emitting light towards the luminescent product. The emitted light comprises at least light of the first color.

The light source provides the same benefits as the luminescent product according to the first aspect of the invention and has similar embodiments with similar effects as the corresponding embodiments of the product. The light source may be a solid state light source, such as a laser diode or a light emitting diode. The solid state light emitter may emit in the blue violet part of the light spectrum and may also emit in the UV part of the spectrum. The luminescent material may be configured to convert the light in the UV spectrum towards light in the visible spectrum.

In an embodiment, the light source may comprise more than one light emitter. The plurality of light emitters may emit all the same color of light, or some of the light emitters may emit a different color of light. At least one light emitter emits light which comprises the first color of light.

In another embodiment, the light source further comprises a cavity in between the light emitter and a light exit window, wherein the cavity is at least partly filled with the luminescent product.

The embodiment allows the manufacturing of retrofit light bulbs wherein instead of a filament a single solid state light emitter may be used which emits a single color and wherein the luminescent product generates other colors of light such that the total light output of the retrofit light bulb is substantially white light, or light which has the color spectrum of a traditional light bulb. Further, the luminescent product redirects a part of the light such that light is emitted into the ambient along the whole bulb, because the luminescent product partly functions as a scattering and diffusing product.

According to a third aspect of the invention a luminaire is provided which comprises the light source according to the third aspect of the invention.

The luminaire provides the same benefits as the light source according to the second aspect of the invention and has similar embodiments with similar effects as the corresponding embodiments of the light source.

These and other aspects of the invention are apparent from and will be elucidated with reference to the embodiments described hereinafter.

It will be appreciated by those skilled in the art that two or more of the above-mentioned embodiments, implementations, and/or aspects of the invention may be combined in any way deemed useful.

Modifications and variations of the luminescent product, lamp, and/or luminaire, which correspond to the described modifications and variations of the luminescent product, can be carried out by a person skilled in the art on the basis of the present description.

It should be noted that items denoted by the same reference numerals in different FIGS. have the same structural features and the same functions, or are the same signals. Where the function and/or structure of such an item have been explained, there is no necessity for repeated explanation thereof in the detailed description.

The FIGS. are purely diagrammatic and not drawn to scale. Particularly for clarity, some dimensions are exaggerated strongly.

DETAILED DESCRIPTION

Figure 1A:
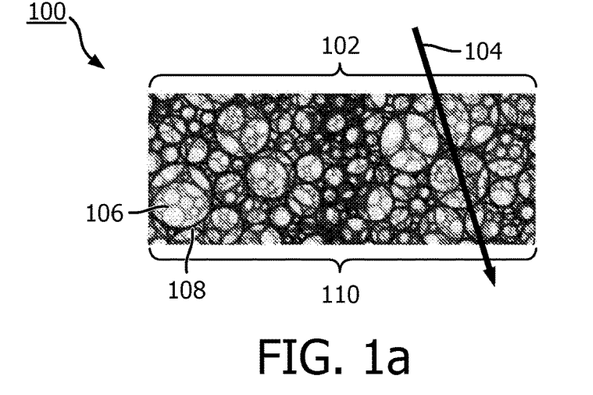
FIGS. 1a to 1d schematically show different embodiments of a luminescent product according to the first aspect of the invention, FIG. 2 schematically shows a detail of the luminescent product being a foam, FIG. 3a schematically shows an embodiment of the luminescent product being a foam with an open cell structure, FIG. 3b schematically shows an embodiment of the luminescent product being a syntactic foam, FIGS. 4a and 4b schematically show embodiments of a lamp according to the second aspect of the invention, FIG. 5a schematically shows embodiments of the lamp comprising the luminescent product, FIG. 5b schematically shows an embodiment of a luminaire according to the third aspect of the invention, and FIGS. 6a and 6b schematically show further applications of the luminescent product.

A first embodiment is shown in FIG. 1a. A luminescent product 100 has a three dimensional structure of a foam. The luminescent product 100 has a first side 102 and a second side 110 with is different from the first side 102. Foam consists of cells 106 enclosed by walls 108. The walls are of a matrix polymer which comprises a luminescent material. The luminescent material may convert light of a first color into light of a second color. The cells 106 are filled with another material, which may be a gas, for example air, or a liquid. The luminescent product 100 is at least light transmitting. A light beam 104 which impinges on the first side 102 travels through the luminescent product 100 substantially in a straight line and at least a part of the light of the light beam, which impinges on the first side 102, leaves the luminescent product 100 at the second side 110. As is seen in FIG. 1a, the light beam 104 passes several times a wall 108 around a cell 106. When the light beam 104 enters a wall 108, and consequently exists a cell 106, the light beam 104 passes an interface between the another material and the matrix polymer. When the light beam 104 exits a wall 108, and enters the cell 106, the light beam 104 passes for the second time an interface between the matrix polymer and the another material. While the light beam 104 travels through the luminescent product 100 a small portion of the light may be absorbed. If the light beam comprises light of the first color, another portion of the light excites the luminescent material, which is present in the walls 108 around the cells 106, and as such at least a part of this portion is converted to light of the second color. Luminescent materials do not convert all energy of the light of the first color that has been absorbed into energy that is emitted in the light of the second color. A part of the absorbed light is converted into heat because of the Stokes shift of the luminescent material. This heat is conducted from the luminescent material to the matrix polymer, and because the matrix polymer has a huge interface area towards the another material, a significant part of the heat is conducted towards the another material. Thus, the generated heat is well spread throughout the whole luminescent product, which prevents a relatively high local temperature in or near the luminescent material. The lifetime of luminescent material and the efficiency of the luminescent material strongly depend on the maximum temperature to which the luminescent material is exposed to. Thus, if the heat is well spread, and, consequently, the temperature of the luminescent material remains relatively low, the lifetime of the luminescent material will be long and the luminescent material operates efficient. It is to be noted that in other embodiments the cells may be filled with the matrix polymer and the walls are made of another (solid) material.

Figure 1B:
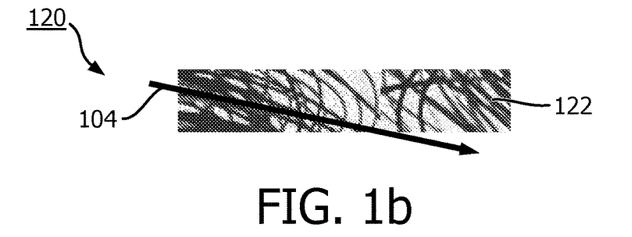

FIG. 1b presents another embodiment of a luminescent product 120. The luminescent product 120 comprises a plurality of fibers 122 of the matrix polymer which are separated by another material. Although FIG. 1b presents only a limited number of fibers 122, in practical embodiments the luminescent product is a block which comprises a lot of fibers 122. At the points where the fibers touch each other, they may be glued or melted together thereby forming a kind of solid block. The fibers 122 of the matrix polymer further comprise a luminescent material for converting light from the first color into light of the second color. As seen in FIG. 1b, if a light beam enters the luminescent product 120 at a first side and exits the luminescent product at second side being different from the first side, the light beam passes at least four times an interface between the another material and the matrix polymer. In the fibers 122 a part of the light of the light beam 104 may be converted to light of the second color by the luminescent material. During the conversion heat is generated and because of the large interface area between the matrix polymer of the fibers 122 and the another material, heat is conducted towards the another material and the temperature of the fibers 122 is kept relatively low.

Figure 1C:
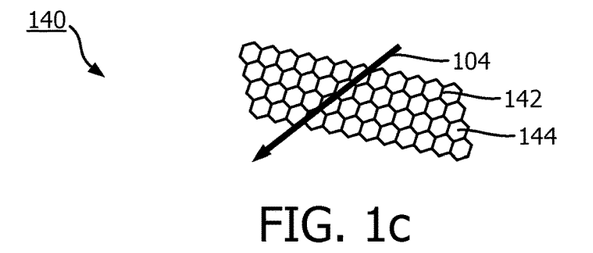

FIG. 1c presents another embodiment of a luminescent product 140. The luminescent product 140 has a three dimensional structure which comprises hexagonal cells 144 which are separated by walls 142. Thus, the three dimensional structure has the structure of a honeycomb. It is to be noted that FIG. 1c only presents a cross-section of the three dimensional structure. The hexagonal cells 144 extend in a direction substantial orthogonal to the imaginary plane of the presented cross-section. The cells 144 may be closed, or may be open at one or both sides. The cells 144 are filled with another material, for example, air or water. The walls 142 are made of a matrix poly which comprises the luminescent material which has been discussed in previous embodiments. Further, in line with the previously discussed embodiments, a light beam 104 passes a plurality of walls thereby passing several times luminescent material which may convert a part of the light of the light beam 104 towards light of another color. The another material in the cells 144 receive a part of the heat that is generated by the luminescent material and as such the heat is well-spread through the luminescent product 140.

Figure 1D:
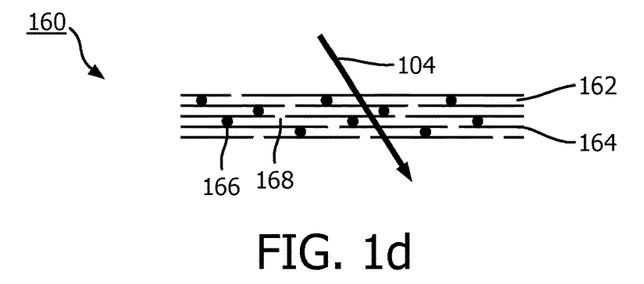

FIG. 1d presents a further embodiment of a luminescent product 160. The luminescent product 160 comprises a stack of layers with layers of a matrix polymer 164 comprising a luminescent material and layers of another material 162. The layers of a matrix polymer 164 and the layers of another material 162 alternate. The layers of the matrix polymer 164 may have holes 168 which connect the different layers of the another material 162. Further, the layers of another material 162 may comprise spacers 166 which are, for example, small pellets to keep the layers of the matrix polymer 164 separated. The spacers 166 may be made of the matrix polymer as well and may also comprise the luminescent material, however, other suitable materials may be used as well.

Figure 2:
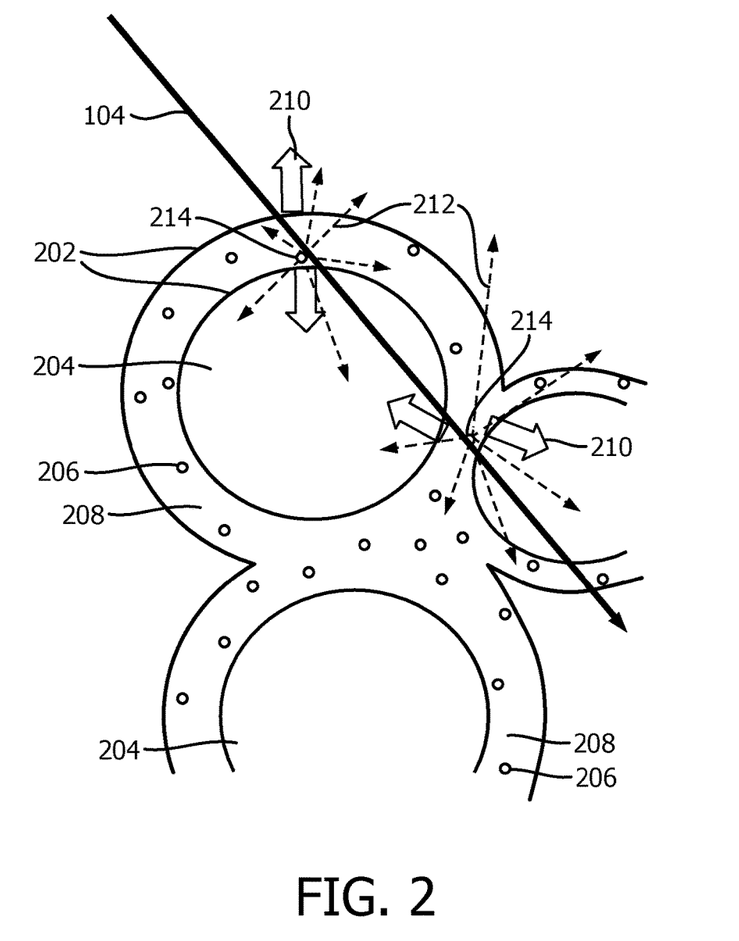

In FIG. 2 a detail of the foam of FIG. 1a is presented. The foam comprises cells 204 which are enclosed by walls 208. The material of the walls 208 is a matrix polymer which comprises luminescent particles 206, 214. The cells 204 are filled with another material. Between the cells 204 and the walls 108 are interfaces 202 between the another material and the matrix polymer. A light beam 104 travels through the light transmitting foam. In FIG. 2 the light beam 104 passes at least 6 times an interface 202 between the another material and the matrix polymer. When the light beam 104 is transmitted through the walls 208 it may pass a luminescent particle 206, 214. In FIG. 2 two luminescent particles 214 are in the light beam. The two luminescent particles 214 absorb some light from the light beam and convert this light to light of another color 212. The luminescent particles 214 emit the light of the second color 212 substantially in all directions. The conversion from light of the light beam 104 towards light of the second color 212 is not fully efficient and some heat is generated because of the Stokes shift. At the interfaces 202 a relatively large part of heat 210 is conducted from the matrix polymer towards the another material. Especially when the another material has a relatively high heat capacitance, a lot of heat 210 is absorbed by the another material. Thus, the another material in the cells 204 becomes warmer, while the temperature of the walls 208 remains relatively low. If the temperature of the walls 208 remains relatively low, the luminescent particles are not exposed to high temperature which enhances their lifetime and their efficiency.

The luminescent particles 206, 214 are not by definition luminescent particles made of a single luminescent material. Different luminescent materials may be used in the matrix polymer such that light of the light beam 104 may be converted to a plurality of colors of light. Practical luminescent materials are organic luminescent materials which comprise perylene derivatives, such as lumogen Red R305, lumogen Yellow R083 or R170, lumogen Orange R240, which are commercially available materials which can be obtained from BASF.

Figure 3A:
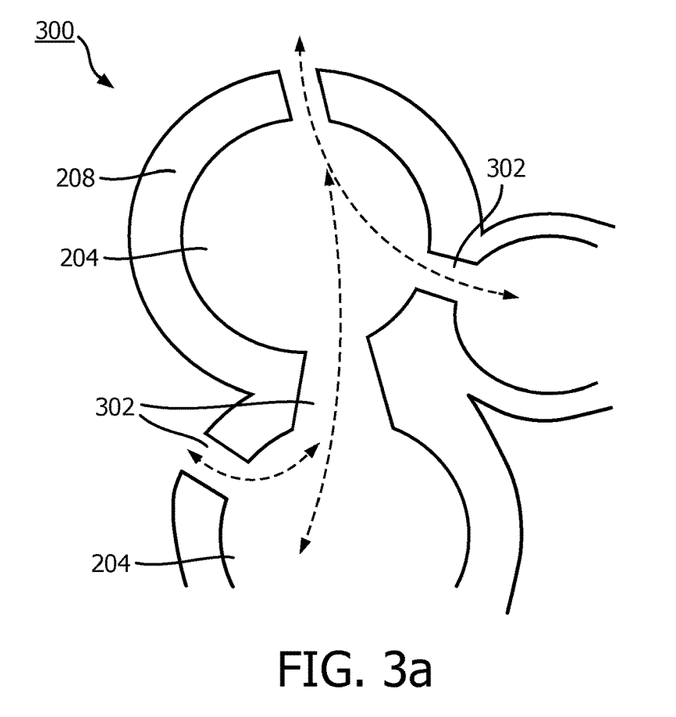

In FIG. 3a a detail of a foam 300 with an open cells structure is presented. The characteristics of the foam 300 are similar to the characteristics of the foam of FIG. 2. The only difference is that the walls 208 comprise holes 302 that connect the cells 204 with each other. Thus, the another material, which is present in the cells 204, may flow from one cell 204 to another cell 204, may flow to the ambient of the foam, or may even flow from the ambient towards the cells 204. The flow of the another material may conduct heat and as such heat is transported from the inner body of the foam 300 towards the ambient. If the foam 300 is used in an environment of air, the another material will be air. In other embodiments, the foam 300 may be used in a liquid and in that case the another material is the liquid. Consequently, the heat which is generated by the luminescent material in the walls 208 is transported away from the foam 300 and as such the temperature of the foam 300 is kept within acceptable limits.

In FIG. 3b another embodiment of a foam is presented. FIG. 3b schematically presents a cross-section of a syntactic foam 350. The syntactic foam is a mass made of the matrix polymer 352 in which hollow particles 354 are present. The hollow particles 354 are filled with the another material, which is for example a gas, a liquid or a phase shift material. The hollow particles 354 themselves may be manufactured, for example, of glass or of another polymer and consequently the glass or the another polymer is the interface between the another material and the matrix polymer 352. The heat, which is generated by the luminescent material being present in the matrix polymer 352, is partly conducted via the interface area towards the another material. Especially, if a phase shift material is used inside the hollow particles 354, the hollow particles 354 may absorb a lot of heat and as such prevent the rise of the temperature of the syntactic foam above unacceptable levels.

Figure 4A:
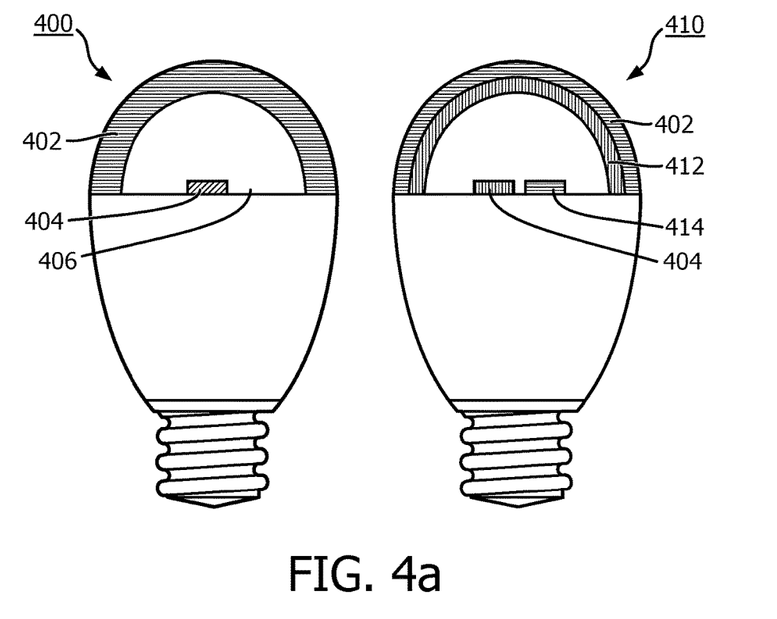

In FIG. 4a two embodiments of a lamp 400, 410 are presented which comprises a luminescent product 402, 412 according to the first aspect of the invention and which comprises a light emitter 404, 414. The lamp 400 comprises a cavity 406 which is enclosed by a light exit window of glass. The cavity has a base on which a light emitter 404 is provided. The light emitter 404 may be a solid state light emitting device, such as a light emitting diode, an organic light emitting diode, or a laser diode. The light emitter 406 may emit light of a single color, or of a spectrum of different wavelengths, and the wavelengths of the light may be in the visible spectrum, such as blue light, or in a spectrum of light that is close to the visible spectrum such as violet or ultra violet spectrum. The cavity is partly filled with the luminescent product 402 according to the first aspect of the invention. A layer of the luminescent product 402 is applied to the glass of the light exit window. The luminescent product 402 is, for example, one of the foams which has been discussed in the context of FIGS. 1 to 3. The luminescent material in the luminescent product 402 may convert all the light which is received from the light emitter 404 towards another color of light, or may convert a portion of the light and transmits another portion of the light towards the light exit window. Thus, the light which is emitted into the ambient at least comprises light which is emitted by the luminescent material and may comprise light which originates directly from the light emitter 404. By selecting specific luminescent materials and/or specific light emitters and/or by dimensioning the luminescent product at a specific size, a specific light output distribution may be obtained by the lamp 400.

The cavity 404 comprises a gas which, in an embodiment, is the same gas as the gas which is used as the another material in the foam 402. If the foam 402 has an open cell structure, the gas may circulate and transport heat to the cavity 404 as well. Advantageous gasses are Nitrogen or Helium because they prevent degradation of the luminescent material.

At the right end of FIG. 4a another lamp 410 is presented which is a variant of lamp 400. The another lamp 410 comprises two different light emitters 404, 414 which each emit light of another color spectrum. Further, inside the cavity, two layers of a luminescent product 402, 412 are applied to the light exit window. By using more than one light emitter and using more than one luminescent products, the spectrum of the light emitted through the light exit window may be closer to a spectrum of a traditional lamp, or may be white light with a broad spectrum of wavelengths such that a better color rendering may be obtained with the light of lamp 410. It is to be noted that the lamps 400, 410 are not limited to the specific combination of one light emitter 404 and one luminescent product 402, and the specific combination of two light emitters 404, 414 and two luminescent products 402, 412. Different combinations are possible, which include combinations with more than two light emitters or more than two luminescent products.

Figure 4B:
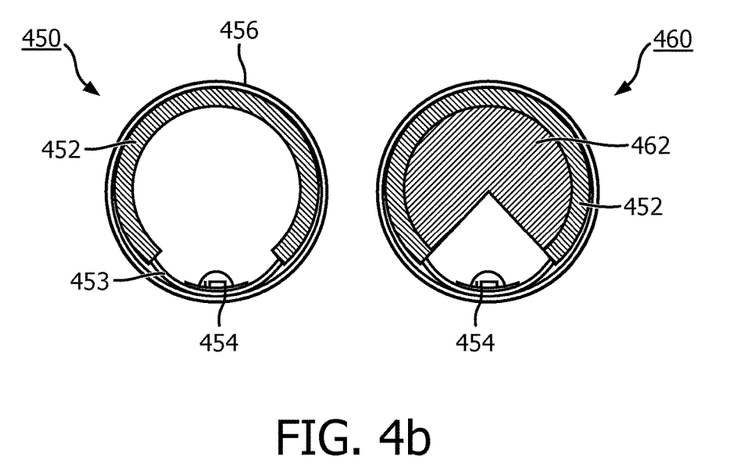

In FIG. 4b two other embodiments of a lamp 450, 460 according to the second aspect of the invention are presented. In FIG. 4b a schematically drawn cross-section of a tube 456 is presented. At one side of the tube 456 a light emitter 454 is placed on a substrate which is attached to a reflector 453. The tube 456 with the reflector extends into a direction substantially perpendicular to the imaginary plane of the presented cross-section. Along the tube 456 a plurality of light emitters 454 are placed on the reflector 453. In the presented embodiment, the light emitter 454 is a domed light emitting diode. Other light emitters may also be used in the tube 456 of the embodiment. The light emitted by the light emitter 454 impinges on a luminescent product 452. A portion of the light of the light emitter is transmitted through the luminescent product 452 before being emitted into the ambient of the tube 456, and another portion of the light is converted by the luminescent material of the luminescent product 452 towards another color of light. The heat which is generated in the luminescent product 452 is well spread through the whole luminescent product 452 and may be transported towards the inner space of the tube 456 and may be conducted via the tube 456 towards the environment of the tube 456. The temperature of the luminescent material in the luminescent product 452 remains within acceptable limits and, consequently, the luminescent material has a long lifetime.

At the right end of the FIG. 4b another lamp 460 is presented which is similar to the lamp 450, however, the another lamp 460 comprises an additional luminescent product 462 which converts a portion of the light of the light emitter 454 towards another color than the color which is generated in the luminescent product 452.

Figure 5A:
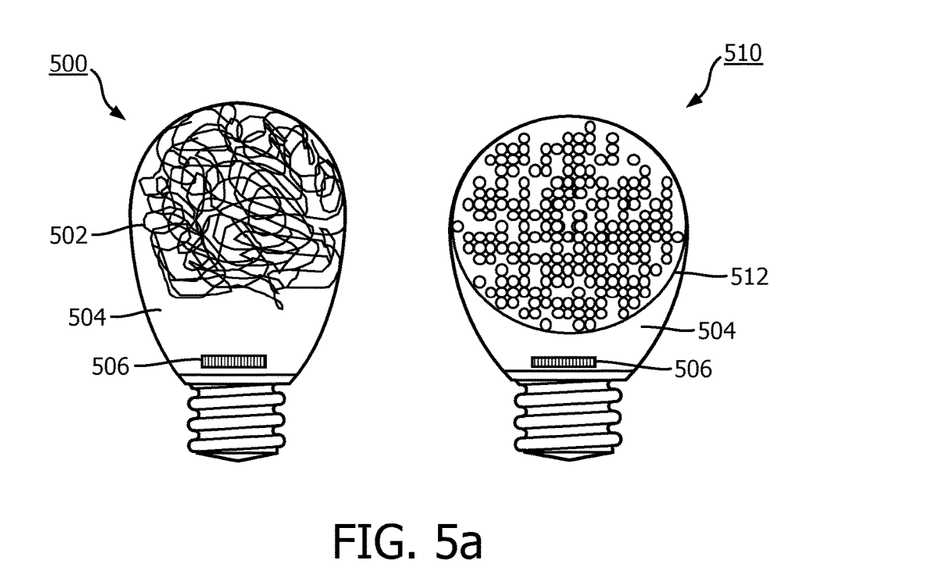

FIG. 5a presents two embodiments of retrofit lamps 500, 510. Retrofit lamp 500 comprises a light bulb which encloses a cavity 504 which is filled with another material. At the base of the cavity 504 is provided a light emitter 506 which emits light towards the luminescent product 502 which is provided within the light bulb. The luminescent product 502 comprises a bulk of fibers made of a matrix polymer which comprises a luminescent material. The retrofit lamp 510 comprises inside the cavity 504 a luminescent product 512 which is syntactic foam comprising hollow particles. The luminescent product 512 is presented in black, however, black is not the color in the real product. Black is only used for clarity and in the real product the luminescent product 512 is at least light transmitting.

Figure 5B:
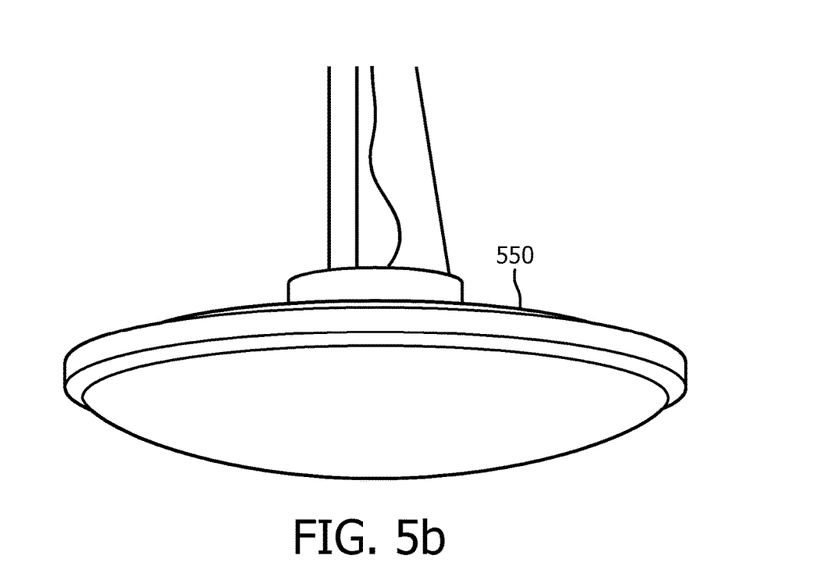

FIG. 5b presents an embodiment of luminaire 550 which comprises a lamp according to the second aspect of the invention. For example, inside the luminaire 550 a retrofit lamp 500, 510 is used in accordance with the embodiments of FIG. 5a.

Figure 6A:
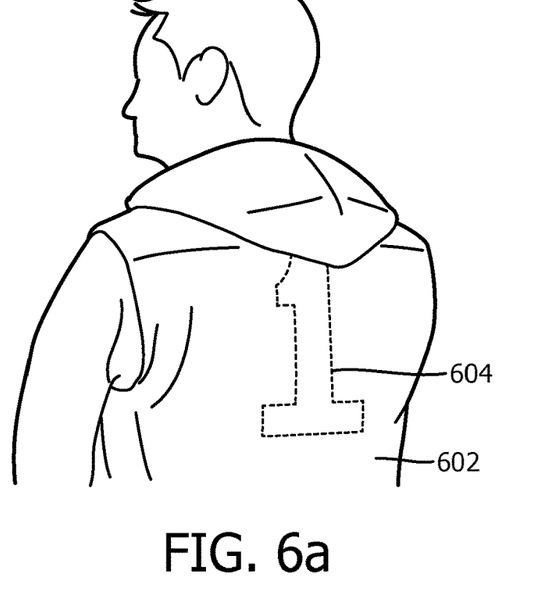
Figure 6B:
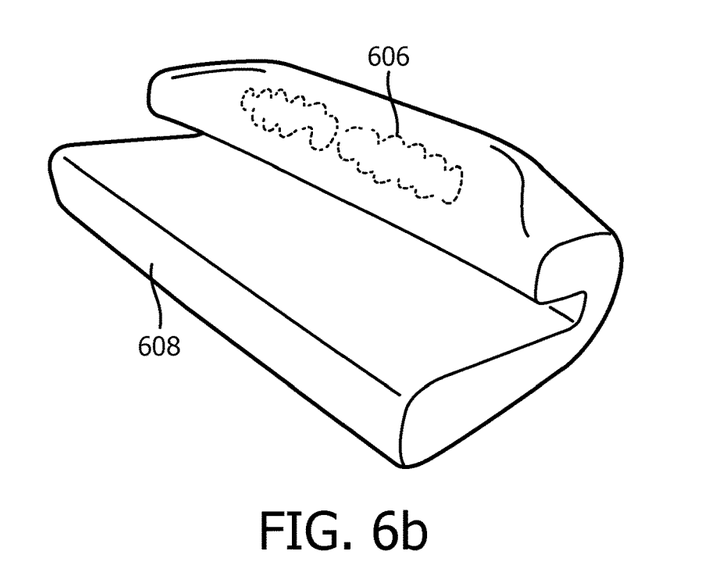

FIG. 6a presents another application of the luminescent product 604 according to the invention. Because a foam, or a bunch fibers may be formed in any suitable shape, and may be flexible, the luminescent product 604 may be used inside a jacket 602 and is, for example, formed in the shape of the number 1. A plurality of light emitters, which are placed at the back side of the luminescent product 604, emit light towards the luminescent product 604 which subsequently emits light through the fabric of the jacket 602. The same principle is shown in FIG. 6b, wherein the luminescent product 606 is used in the back of a couch 608.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A luminescent product for converting light of a first color into light of a second color, the luminescent product comprising:

a matrix polymer comprising a luminescent material for converting the light of the first color into the light of the second color; and another material being light transmitting, the luminescent product being at least partially light transmitting, and the matrix polymer having a three dimensional structure having multiple surfaces being between the matrix polymer and the another material to allow, in use, a part of a light beam, which impinges on a first side of the luminescent product, to pass at least four times interfaces between the matrix polymer and the another material before the part of the light beam leaves the luminescent product at a second side of the luminescent product, wherein at least a part of the three dimensional structure comprises a foam and the foam comprises a solid foam with a given cell structure, wherein the cell structure is non-periodic, wherein at least a portion of the cell structure is an open cell structure and wherein a majority of open cell structure cells of the luminescent product have a respective substantially circular cross-section and are configured with a respective width that is larger than a width of a respective hole coupling the respective open cell structure cell to a respective adjacent open cell structure cell wherein a wall of each of the open cell structure cells intersects with at least one wall of the respective adjacent open cell structure cell.

2. The luminescent product according to claim 1, wherein the another material comprises a liquid or a gas.

3. The luminescent product according to claim 1, wherein the luminescent material comprises an organic phosphor.

4. The luminescent product according to claim 3, wherein the organic phosphor comprises perylene derivates.

5. The luminescent product according to claim 1, wherein the three dimensional structure allows, in use, the part of the light beam, which impinges on the first side of the luminescent product, to pass interfaces between the matrix polymer comprising the luminescent material and the another material at least eight times.

6. A light source comprising
the luminescent product according to claim 1, and
a light emitter for emitting light comprising at least light of the first color towards the luminescent product.

7. The light source according to claim 6, further comprising a cavity in between the light emitter and a light exit window, wherein the cavity is at least partly filled with the luminescent product.

8. A luminaire comprising the light source according to claim 6.

9. The luminescent product according to claim 1, wherein the given cell structure is composed of cells of different sizes.

10. The luminescent product according to claim 1, wherein the given cell structure is composed of cells including said another material.

11. A luminescent product for converting light of a first color into light of a second color, the luminescent product comprising:

a matrix polymer comprising a luminescent material for converting the light of the first color into the light of the second color; and another material being light transmitting, the luminescent product being at least partially light transmitting, and the matrix polymer having a three dimensional structure having multiple surfaces between the matrix polymer and the another material to allow, in use, a part of a light beam, which impinges on a first side of the luminescent product, to pass interfaces between the matrix polymer and the another material before the part of the light beam leaves the luminescent product at another side of the luminescent product,
wherein at least a part of the three dimensional structure comprises a foam and the foam comprises a solid foam with a given cell structure, wherein the cell structure is non-periodic, wherein at least a portion of the cell structure is an open cell structure and wherein a majority of open cell structure cells of the luminescent product have a respective substantially circular cross-section and are configured with a respective width that is larger than a width of a respective hole coupling the respective open cell structure cell to a respective adjacent open cell structure cell wherein a wall of each of the open cell structure cells intersects with at least one wall of the respective adjacent open cell structure cell.

12. The luminescent product according to claim 11, wherein the given cell structure is composed of cells of different sizes.

13. The luminescent product according to claim 11, wherein the given cell structure is composed of cells including said another material.

\* \* \* \* \*